Sept. 29, 1931.                A. J. JANSSON                1,825,352
                           RUBBER SPRING SHACKLE
                           Filed Oct. 25, 1929
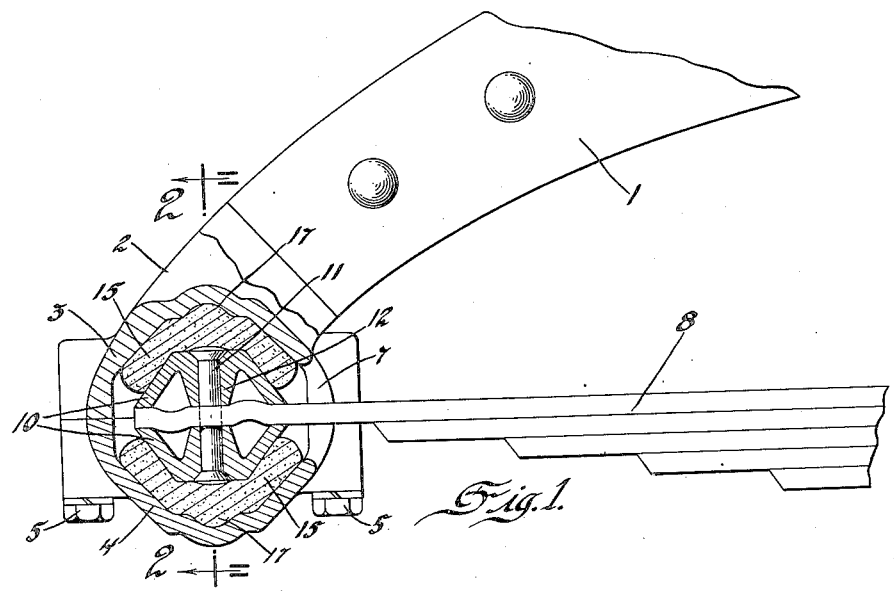
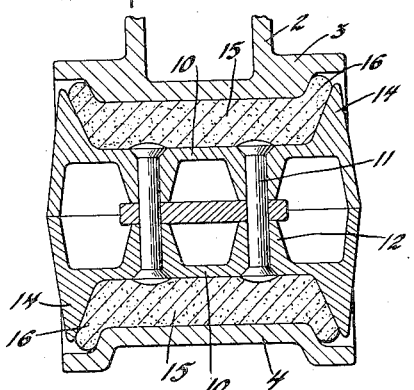
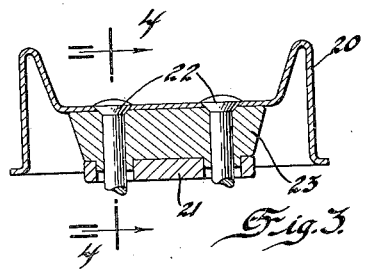
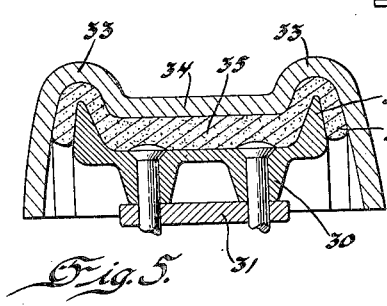
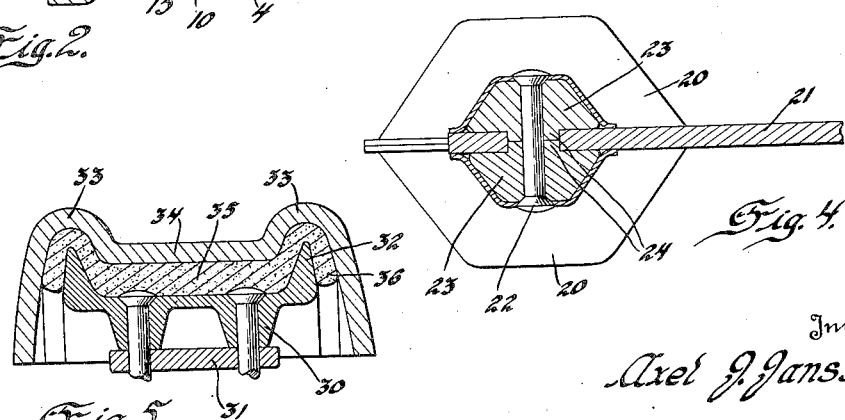
Inventor
Axel J. Jansson
By Blackmore, Spencer & Hiel
                        Attorneys Patented Sept. 29, 1931

1,825,352

UNITED STATES PATENT OFFICE

AXEL J. JANSSON, OF FLINT, MICHIGAN, ASSIGNOR TO GENERAL MOTORS CORPORATION, OF DETROIT, MICHIGAN, A CORPORATION OF DELAWARE

RUBBER SPRING SHACKLE

Application filed October 25, 1929. Serial No. 402,352.

This invention relates to motor vehicles and the like and more particularly to a spring shackle joint or pivotal connection for the end of a load-supporting spring.

It is an object of the invention to provide an improved type of connection to accommodate the necessary movement of the spring relative to the chassis frame upon spring deflection and which, in addition to being simple in construction and economical to manufacture and assemble, will be noiseless in use, free from the need of lubrication or other periodic and regular attention, efficient in operation and unlikely to get out of order.

Another object of the invention is to provide a joint embodying resilient cushioning or insulating material between movable parts in which the parts are joined together in interlocking relation with the cushioning material so arranged as to not only accommodate relative rotary movements but to also effectually cushion and resist side thrust and the damaging effects thereof, such as tend to occur, for example, when the vehicle is negotiating sharp curves at high speed.

A further object is to provide a joint wherein a spool-like inner joint member, into whose channel is nested the outer member and the interposed cushioning material, is fitted and secured to the spring in a fashion to relieve the fastening attachments of strain.

Additional objects and features of advantage will become apparent during the course of the following specification when taken in connection with accompanying drawings.

In the drawings, Figure 1 is a fragmentary side elevation showing the chassis frame connected with the load supporting spring in accordance with the present invention, parts being shown in section. Figure 2 is a transverse sectional view of the joint and is taken on line 2—2 of Figure 1. Figure 3 is a detail sectional view showing a modification of one of the joint members. Figure 4 is a sectional view taken on line 4—4 of Figure 3. Figure 5 is a detailed sectional view illustrating a modification.

Referring to the drawings, reference number 1 indicates a down turned horn at the front end of one of the longitudinally extending chassis frame members, in which is secured, as by means of rivets or the like, the horn bracket 2, that terminates in a head 3, having a concave under-surface. A separable concave retainer cap 4 is removably secured to the head as by means of studs 5, passing through lateral lugs on the head and cap, with the cavities opposed to one another to afford, in effect, a hollow housing, the diameter of the space through the housing being enlarged at opposite ends thereof. The rear wall of the housing is cut away or provided with an opening 7 for the reception of the main leaf of the conventional vehicle spring 8, with the end of the spring within the housing undulated or waved and carrying the spool-like inner member of the joint. This spool-like member, which may be formed of cast metal, is shown as comprising two sections 10—10, secured back to back and on opposite sides of the spring end as by means of rivets 11, the adjacent backs of the two elements being cored out, for the purpose of reducing weight and cost, and leaving a hollow interior space. Where the rivets 11 pass through parts 10, these parts are shown as being re-enforced by extensions or bosses 12 through which the rivets extend. Into the space between these bosses and the adjacent side wall of the spool, the bent or undulated portion of the spring leaf projects for the purpose of locating the bearing parts and holding the inner joint sections against any tendency toward turning or twisting movement relative to the spring so as to relieve the rivets of twisting or shearing strain.

At each end of the inner spool member, the end flanges 14 project beyond the central reduced portion of the housing and into the enlarged end portion establishing an interlocked relation between the inner and outer members. The peripheral surface of the spool body and the inside surface of the outer member preferably comprise a circumferential succession of angularly disposed flat faces with the flat faces of one member in cooperative and substantially corresponding relation with those on the other, as is clearly illustrated by Figure 1. Interposed between the adjacent surfaces of the two members is preferably positioned non-metallic elastic deformable material, such as rubber, to insulate one from the other, cushion or damp shocks, vibrations and noises and by its deformation permit a limited relative movement between the joint members.

This cushioning material may take the form of a pair of pads, 15, of substantially U shape in longitudinal section, (Figure 2) made identical for convenience and economy of manufacture, and fitted to two or more adjacent flat faces, with the legs 16 of the U extended between the end flanges 14 of the spool and the corresponding seats therefor between the central reduced portion of housing and the enlarged end portions, to cushion and resist axial thrust and side sway. Each cushion is preferably provided with a peripheral rib or bead 17 to fit in a groove in the housing or outer member to hold the pad against displacement.

In lieu of making the inner member of cast metal, the construction shown in Figures 3 and 4 may be adopted. In this case the inner member consists of a pair of sheet metal stampings 20 secured back to back on the spring leaf 21 by rivets 22 with interposed spacer blocks 23. The openings in the spring leaf through which the fastening rivets extend are preferably of a size greater than the diameter of the rivets and each spacer block is provided with lugs or bosses 24 to project partly into the openings to take any twisting strain and relieve the rivets therefrom.

In some cases it may be desirable to use the construction shown in Figure 5, wherein the spool 30 secured to the spring leaf 31 has its end flanges 32 extended into annular grooves or recesses formed in the enlarged bosses 33 on the housing 34, and the ends of the rubber pad 35 are reversely bent around the end flanges as at 36 to provide cushioning material on opposite sides thereof to more effectively cushion side sway.

While the invention has been described more or less specifically it is not limited to exact details referred to and it will be understood that such modifications may be made as come within the scope of appended claims.

I claim:

1. In a spring shackle, the combination with a vehicle frame and a load supporting leaf spring, of a hollow housing on the frame, having a lateral spring receiving opening therein, through which an end of the spring extends to the interior of the housing, a spool-like enlargement on the end of the spring within the housing and elastic deformable material interposed between the spool and housing and between the end flanges of the spool and end seats provided on the housing.

2. In a spring shackle, the combination with a vehicle frame and a load supporting leaf spring, of a hollow housing on the frame having a lateral spring receiving opening therein, through which an end of the spring extends to the interior of the housing, the interior surfaces of the housing consisting of a circumferential succession of flat faces with adjoining faces angularly disposed, a spool-like enlargement on the end of the spring in the housing having flat peripheral surfaces substantially conforming to those of the housing and elastic deformable material between the housing and spool and between the end flanges of the spool and end surfaces of the housing.

3. In a spring shackle, the combination with a vehicle frame and a load supporting leaf spring therefor, of a spool-like member on the end of the spring having its body provided with a succession of flat peripheral surfaces, a hollow member on the frame extending partially into the annular recess of the spool and having an opening in the wall thereof for the extension therethrough of the leaf spring, and having on its inner surface flat faces substantially conforming to the peripheral surface of the spool, and elastic material between the spool and hollow member.

4. The structure of claim 3 wherein the hollow member consists of a bracket permanently secured to the frame and provided with a concavity and a retainer cap detachably secured thereto.

5. The structure of claim 3, wherein the hollow member consists of a bracket permanently secured to the frame and provided with a concavity, and a separable concave cap detachably secured to the bracket with its concavity opposed to that of the bracket.

6. In a spring shackle, the combination with a vehicle frame and a load supporting spring therefor, of a spool on the end of the spring having its body provided with a succession of flat peripheral surfaces, a hollow member on the frame extending partially into the annular recess of the spool and having a pair of spaced annular depressions into which the end flanges of the spool project and a lateral opening for the extension of the spring, the inner surface of the member having a circumferential succession of flat faces in conformity with those of the spool, and elastic material between the spool and member and in said annular depression, on both sides of the end flanges.

7. In a spring shackle, the combination with a vehicle frame and a load supporting spring therefor, of a spool on the end of the spring, a hollow member on the frame extending partially into the annular recess of the spool and having a pair of annular depressions for projection thereinto of the spool end flanges and deformable material interposed between the spool and member and extended into said depressions on both sides of said flanges.

8. In a spring shackle, a hollow housing having a spring receiving opening in the wall thereof, a spring leaf having an indulated end portion projecting through said opening and into the housing, a pair of bearing members positioned on opposite sides of the spring leaf and provided each with a depression into which an undulation extends and elastic deformable material interposed between said bearing members and the housing.

9. In a spring shackle, a hollow housing having a spring receiving opening in the wall thereof, a spring leaf having an undulated end portion projecting through said opening and into the housing, a pair of bearing members riveted to opposite sides of the end portion in such relation to the undulations as to relieve the securing rivets of twisting strain.

10. In a spring shackle, a hollow housing having a spring receiving opening in the wall thereof, a spring leaf having an undulated end portion projecting through said opening and into the housing, and a bearing member riveted to and against the face of the end portion and provided with an opening into which an undulation extends to relieve the securing rivets of twisting strains.

In testimony whereof I affix my signature.

AXEL J. JANSSON.